(12) United States Patent
Wolf et al.

(10) Patent No.: US 7,011,179 B2
(45) Date of Patent: Mar. 14, 2006

(54) AUXILIARY HEATER ARRANGEMENT WITH A MUFFLER

(75) Inventors: Felix Wolf, Augsburg (DE); Peter Otto, Taufkirchen (DE); Ingrid Lanzl, Munich (DE)

(73) Assignee: Webasto Thermosysteme Internatonal GmbH, Stockdorf (DE)

( * ) Notice: Subject to any disclaimer, the term of this patent is extended or adjusted under 35 U.S.C. 154(b) by 0 days.

(21) Appl. No.: 10/234,849

(22) Filed: Sep. 5, 2002

(65) Prior Publication Data

US 2003/0098198 A1   May 29, 2003

(30) Foreign Application Priority Data

Sep. 5, 2001   (DE)   ................................. 101 43 462

(51) Int. Cl.
*F01N 5/02*   (2006.01)
*F01N 1/24*   (2006.01)
*B60H 1/02*   (2006.01)

(52) U.S. Cl. .................... 181/211; 181/258; 237/12.3 C
(58) Field of Classification Search ................ 181/211, 181/229, 258, 227, 228; 431/353, 114; 237/12.3 R, 237/28, 12.3 C; 60/320, 322, 300, 302
See application file for complete search history.

(56) References Cited

U.S. PATENT DOCUMENTS 3,501,257 A * 3/1970 Hebert et al. ................ 431/347
3,723,070 A * 3/1973 Houdry ........................ 60/300
3,733,181 A * 5/1973 Tourtellotte et al. .......... 60/300
3,861,881 A * 1/1975 Nowak ........................ 422/179
4,032,310 A * 6/1977 Ignoffo ....................... 181/211
4,045,157 A * 8/1977 Peterson ..................... 431/114
4,601,168 A * 7/1986 Harris ........................ 181/255
4,625,910 A * 12/1986 Kawamura .................. 237/2 A
4,744,747 A * 5/1988 Kawamura et al. ........... 431/36
4,923,033 A   5/1990 Panick et al.
5,043,147 A * 8/1991 Knight ....................... 181/258
5,206,467 A   4/1993 Nagai et al.
5,233,831 A * 8/1993 Hitomi et al. ................. 60/300
5,293,743 A * 3/1994 Usleman et al. .............. 60/299

(Continued)

FOREIGN PATENT DOCUMENTS

EP   0 638 776 B1   2/1995

(Continued)

*Primary Examiner*—Edgardo San Martin
(74) *Attorney, Agent, or Firm*—David S. Safran

(57) ABSTRACT

An arrangement having an auxiliary heater, a catalytic converter (12) for catalytic post-combustion of exhaust gas from the heater, a muffler (14) for damping of the noise caused by the exhaust gas, and an exhaust line for removing exhaust gas from the auxiliary heater. In order especially to devise an auxiliary heater in which the muffler and the catalytic converter can be installed relatively easily, the muffler (14) and the catalytic converter (12) are combined in sing module (10) that can be located on the exhaust line.

11 Claims, 1 Drawing Sheet

U.S. PATENT DOCUMENTS

| | | | |
|---|---|---|---|
| 5,338,903 A * | 8/1994 | Winberg | 181/231 |
| 5,357,752 A * | 10/1994 | Lucchesi | 60/300 |
| 5,388,404 A * | 2/1995 | Tsumura | 60/300 |
| 5,402,642 A * | 4/1995 | Awasaka et al. | 60/320 |
| 5,450,721 A * | 9/1995 | Golben et al. | 60/320 |
| 5,580,238 A * | 12/1996 | Charles et al. | 431/114 |
| 5,722,588 A * | 3/1998 | Inoue et al. | 237/12.3 C |
| 5,730,946 A * | 3/1998 | Linnarsson | 60/322 |
| 5,849,251 A * | 12/1998 | Timko | 181/227 |
| 5,972,299 A * | 10/1999 | Huang et al. | 60/300 |
| 6,079,629 A * | 6/2000 | Morikawa et al. | 237/12.3 C |
| 6,315,076 B1 * | 11/2001 | Bruck et al. | 181/258 |
| 6,357,226 B1 * | 3/2002 | Borland | 60/300 |
| 6,658,840 B1 * | 12/2003 | Iiyama et al. | 60/300 |
| 6,712,283 B1 * | 3/2004 | Humburg | 237/12.3 C |

FOREIGN PATENT DOCUMENTS

| | | | |
|---|---|---|---|
| JP | 04073512 A | * | 3/1992 |
| JP | 06010661 A | * | 1/1994 |
| JP | 2002309940 A | * | 10/2002 |

* cited by examiner

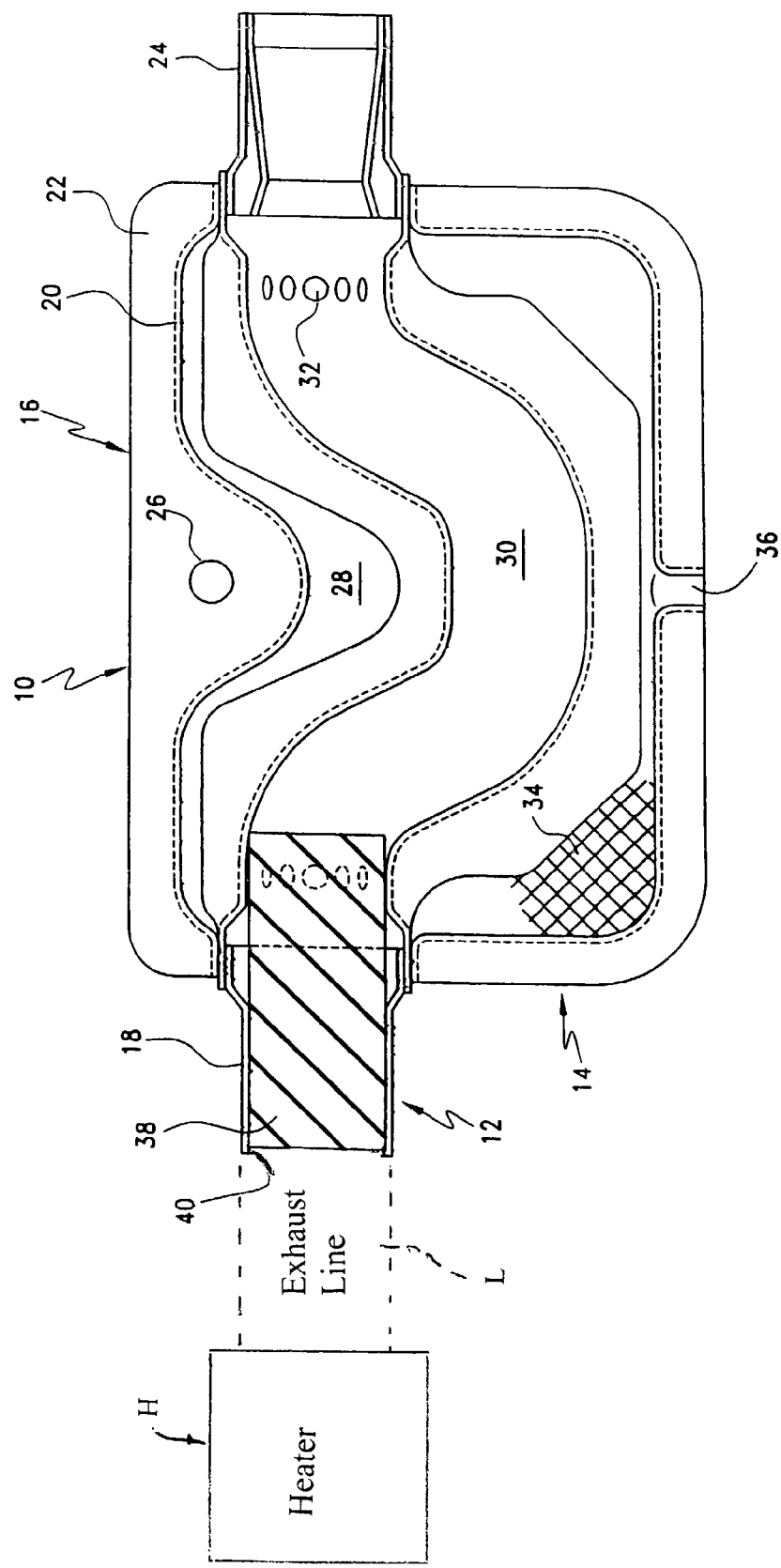

AUXILIARY HEATER ARRANGEMENT WITH A MUFFLER

BACKGROUND OF THE INVENTION

1. Field of the Invention

The invention relates to an auxiliary heater arrangement for a motor vehicle, with an auxiliary heater, a catalytic converter for catalytic post-combustion of the exhaust gas, a muffler for damping of the noise caused by the exhaust gas, and an exhaust line for removing exhaust gas from the auxiliary heater. Furthermore, the invention relates to an auxiliary heater muffler which is suitable for installation on the exhaust line of an auxiliary heater arrangement, and an auxiliary heater catalytic converter and a motor vehicle with the initially mentioned auxiliary heater arrangement.

2. Field of the Invention

An auxiliary heater arrangement of the aforementioned type is known from U.S. Pat. No. 4,923,033. The motor vehicle auxiliary heater device described there has a combustion chamber in which there is a muffler and which itself is made as a muffler. The muffler damps the combustion noise and the combustion gas noise by absorption and by reflection. Furthermore, the muffler can also be designed such that it cleans the combustion gases, for example, by catalytic post-combustion and filtering out the soot particles, when the heater is operated with diesel as the liquid fuel. Depending on the heater type, its own muffler must be made and warehoused for installation.

European Patent EP 0 638 776 B1 discloses a liquid fueled heater for a motor vehicle which operates independently of the engine and which has a combustion chamber, a downstream fire tube and a heat exchanger located concentrically about the combustion chamber and to the fire tube, in which the exhaust gas, after emerging from the fire tube, is deflected and routed through the heat exchanger to the exhaust outlet connector. Between the outside wall of the combustion chamber or the fire tube and the inside wall of the heat exchanger, there is a catalytically active unit. A unit installed in this manner must be matched to the contour of the ribs of the heat exchanger, and therefore, warehoused individually for each heater type. In addition, the installation of the knit is relatively complex and can only be performed manually.

U.S. Pat. No. 5,206,467 discloses a muffler for an internal combustion engine. Within the muffler, a catalytically active layer is located underneath an acoustic damping layer. In an internal combustion engine, the noise of the exhaust ejected from the individual cylinders in rapid sequence, which noise is to be damped, is completely different from the noise which is produced by the almost continuously burning flame of an auxiliary heater. Moreover, the temperature and the composition of the exhaust are different. A muffler for an internal combustion engine is therefore unsuited for an auxiliary heater.

SUMMARY OF THE INVENTION

A primary object of the invention is to improve a heater such that the aforementioned disadvantages are overcome and especially an auxiliary heater is devised in which a muffler and also a catalytic converter can be installed relatively economically.

This object is achieved in accordance with the invention with an auxiliary heater of the initially mentioned type in which the muffler and the catalytic converter are combined in a module located on the exhaust line. Furthermore, the object is achieved with an auxiliary heater muffler which is suitable for installation on the exhaust line of the auxiliary heater, the muffler being combined with a catalytic converter in a module. Finally, the object is achieved with an auxiliary heater catalytic converter which is made as a cartridge such that it can be inserted later into the commercial exhaust line of an auxiliary heater arrangement, and with a motor vehicle in which the auxiliary heater arrangement according to the invention is installed.

Basically, mufflers on auxiliary heaters which are located externally on the exhaust line are known. However, they have the disadvantage that the muffler can corrode and condensate forms in it under certain ambient conditions. In addition, the external muffler requires additional installation space. The invention is based on the idea that, in contrast to existing efforts according to which an external muffler should be avoided, it can be tolerated and can even be desirable to arrange the muffler externally or at least easily accessible from the outside on the auxiliary heater, specifically when it is made as a module together with a catalytic converter.

In accordance with the invention, this module of the muffler and catalytic has a series of special advantages which counterbalance the aforementioned disadvantages.

The module can be easily pre-mounted as a separate component and can be easily mounted subsequently on the auxiliary heater or in a motor vehicle equipped with it. If necessary the module can be pre-mounted in the exhaust line, which must be installed in any event.

With respect to increasing environmental protection efforts, auxiliary heaters already in use can be easily retrofitted with the module of an auxiliary heater muffler of the invention. This takes place in replacement for the muffler present there without the catalytic converter. The auxiliary heater muffler in accordance with the invention is therefore especially suitable for the so-called "after-sale" market. In addition, for the auxiliary beater arrangement according to the invention, various types of auxiliary heaters can be used in a manner which is especially simple in terms of logistics and installation technology, and thus, a large product line with comparatively few basic modules can be set up. Various auxiliary heater types with almost the same combustion output can be equipped with one type of muffler.

The auxiliary heater muffler of the invention, generally, has much better dampening and also exhaust clean-up effect than the mufflers described in U.S. Pat. No. 4,923,033 and European Patent EP 0 638 776 B1 in or on the combustion chamber of the auxiliary heater.

In the auxiliary heater arrangement according to the invention, the catalytic converter is located comparatively far from the combustion chamber. In the catalytic converter, therefore, temperatures prevail which are lower than occur in the immediate vicinity of the combustion chamber. These lower temperatures enable use of sensors on the muffler which detect the composition of the exhaust gas and thus enable control of combustion in the auxiliary heater depending on the exhaust gas composition.

In one advantageous development of the auxiliary heater arrangement according to the invention, the muffler and the catalytic converter are combined in a common housing. Thus, a housing which would otherwise be required is omitted so that the module is made more economical overall. In addition, the module requires only an especially small installation space.

When the housing is matched to the existing housing of a commercial auxiliary heater muffler, an already installed muffler can be especially easily replaced by a combination of the muffler and the catalytic converter.

The catalytic converter can be produced especially easily by its being made as wire knit which is coated with the catalytic layer.

In order to devise an especially efficient catalytic converter, it is made as a louver carrier with louvers which are coated with a catalytic layer.

The catalytic converter is advantageously made such that it is inserted into the line section of the muffler and can be fixed in it. Installation is especially simple when the catalytic converter is made as metal cartridge. It can be inserted, for example, from the outside into the line section of the muffler where it is fixed against a stop. Such a cartridge can also be installed later into existing mufflers. When the muffler is installed in the exhaust line, there can be a second stop on it, which prevents the cartridge from migrating out of the muffler. In the latter development the cleaning capacity of the catalytic converter is especially high when it essentially entirely fills the cross section of the line segment of the muffler.

An embodiment of the auxiliary heater arrangement in accordance with the invention is explained below with reference to the accompanying drawings.

BRIEF DESCRIPTION OF THE DRAWINGS

The sole FIGURE of the drawings is a lengthwise section of an embodiment of an auxiliary heater muffler for an auxiliary heater arrangement according to the invention with a schematically depicted heater and exhaust line.

DETAILED DESCRIPTION OF THE INVENTION

The module 10 shown in the FIGURE is intended for installation in an exhaust line L of an auxiliary heater H for a motor vehicle, neither the auxiliary heater nor the exhaust line being further shown. The catalytic converter 12 and the muffler 14 are combined into a module 10.

The catalytic converter 12 and the muffler 14 are located in a common housing 16 formed of several housing parts. Housing 16 comprises an inlet connector 18 which is located on the left with reference to FIG. 1. The inlet connector 18 discharges into an essentially cuboidal space which is formed by two half shells 20, 22, shell 20 being represented by dashed lines. An outlet connector 24 emerges from this space on the side which is the right side in the FIGURE.

The two half shells 20, 22 are made as deep drawn parts, and are pressed to one another. Here, the inlet connector 18 and the outlet connector 24 are inserted into one of the half shells 20, 22, before pressing and are then fixed in place by pressing. Thus, the housing 16 is produced especially cost-favorably. Alternatively, the half shells can be welded to one another.

In the half shells 20, 22, in the pressed edge which is the top edge relative in the FIGURE, a hole 26 is made in the middle which is intended for attaching the housing 16 to a component of the motor vehicle which is not shown.

By means of the half shells 20, 22, a partition or intermediate wall 28 is formed which projects roughly halfway into the aforementioned space.

A pipe 30 bent in a U-shape connects the inlet connector 18 to the outlet connector 24. The pipe 30 is perforated on its entire jacket surface, i.e., it is provided with a host of small openings 32 which are regularly distributed over the respective periphery of the pipe 30.

The inlet connector 18 and the outlet connector 24 are not arranged in the middle, but are offset to the top, as shown in the FIGURE, on the respective sides of the half shells 20, 22. The U-shaped pipe 30 winds from these locations relative to FIG. 1 and thus bypasses the intermediate wall 28.

On the bottom of the space formed by the half shells 20, 22, i.e., in the area which is lowermost if the FIGURE, the half shells are lined inside with a damping tiling 34. In the corners of the space, the damping tiling 34 is drawn upward so that the corners are rounded to the inside or are provided with a bevel.

Furthermore, in the middle, a condensate drain 36 is made on the bottom of the half shells 20, 22.

In the inlet connector 18, as the catalytic converter 12 an essentially circularly cylindrical cartridge 38 made of coated louvers is inserted. The louvers are provided with a catalytic coating. On the end which is on the left in the FIGURE, the cartridge 38 is provided with a collar 40 which extends around its outer end portion.

In the operation of the indicated auxiliary heater, exhaust gas travels from it into the indicated exhaust line. In this exhaust line, the module 10 is installed. The exhaust gas travels at the inlet connector 18 into the cartridge 38 in which catalytic post-combustion of the exhaust gas takes place. Here, especially the amount of carbon monoxide in the exhaust gas, is reduced and soot particles are filtered out of the exhaust, in the case of diesel as the fuel.

Then, the exhaust is conveyed through the pipe 30 from which it travels in part through the openings 32 into the surrounding space and upstream of the damping tiling 34. In this way, pressure waves of the exhaust are for the most part canceled out by one another and converted into mechanical vibration work.

The cartridge 38 is made and matched to the inlet connector 18 such that it can be mounted in the latter simply by pushing it in. The collar 40 prevents it from being pushed too far and moreover keeps the cartridge in the inlet connector 18 after the inlet connector 18 is mounted on the exhaust line. For this reason, on the exhaust line, a counterstop (not shown) is made for the collar 40.

In an unillustrated embodiment, the cartridge 38 is made essentially as is shown in the FIGURE. However, the cartridge 38 is not located in the muffler inlet from the exhaust line, but elsewhere on the exhaust line. For example, the cartridge 38 can be inserted where the exhaust line discharges into the open and can be attached at this location.

What is claimed is:

1. Auxiliary heater arrangement for a motor vehicle, comprising:
    an auxiliary heater has a combustion chamber, and is operative for drawing in a heat exchange medium, heating the heat exchange medium and supplying the heated heat exchange medium to a vehicle interior space, and
    a catalytic converter for catalytic post-combustion of the exhaust gas from combustion in the auxiliary heater,
    a muffler for damping of the noise caused by the exhaust gas resulting from the combustion in the auxiliary heater, and
    an external exhaust line connected downstream of the auxiliary heater for removing exhaust gas from the combustion chamber of the auxiliary heater,
    wherein the muffler and the catalytic converter are combined into a single module which is located on the exhaust line.

2. Auxiliary heater arrangement as claimed in claim 1, wherein the muffler and the catalytic converter are combined in a common housing.

3. Auxiliary heater arrangement as claimed in claim 1, wherein the catalytic converter is inserted and is fixed into a line section of the muffler.

4. Auxiliary heater arrangement as claimed in claim 1, wherein the catalytic converter is a metal cartridge.

5. Auxiliary heater arrangement as claimed in claim 4, wherein the catalytic converter essentially entirely fills the cross section of the line segment of the muffler.

6. Auxiliary heater muffler arrangement for installation on an external exhaust line of an auxiliary heater downstream of the auxiliary heater, the muffler arrangement comprising a muffler and a catalytic converter,
   wherein the auxiliary heater has a combustion chamber, and is operative for drawing in a heat exchange medium, heating the heat exchange medium and supplying the heated heat exchange medium to a vehicle interior space, and
   wherein the muffler is adapted for damping of the noise caused by the exhaust gas deriving from the combustion in the auxiliary heater,
   wherein the catalytic converter is adapted for catalytic post-combustion of the exhaust gas deriving from the combustion in the auxiliary heater, and
   wherein the muffler and the catalytic converter are combined into a single module.

7. Auxiliary heater muffler as claimed in claim 6, wherein the muffler and the catalytic converter are contained in a common housing.

8. Auxiliary heater muffler as claimed in claim 6, wherein the catalytic converter is inserted and fixed into a line section of the muffler.

9. Auxiliary heater muffler as claimed in claim 6, wherein the catalytic converter is a cartridge.

10. Auxiliary heater muffler as claimed in claim 9, wherein the catalytic converter essentially entirely fills the cross section of a line segment of the muffler.

11. Auxiliary heater arrangement as claimed in claim 1, further comprising sensors on the muffler for detecting the composition of the exhaust gas, and wherein a controller of the auxiliary heater is adapted to combustion depending on the detected exhaust gas composition.

* * * * *